United States Patent [19]

Grant et al.

[11] 4,286,025
[45] Aug. 25, 1981

[54] DETECTOR FOR THERMOLUMINESCENCE DOSIMETRY

[76] Inventors: Zigurd A. Grant, ulitsa Kokles, 6, kv. 15; Maiga M. Grube, ulitsa Slokas, 183, kv. 100; Vitaly I. Gotlib, ulitsa Raunas, 39/2, kv. 10, all of Riga, U.S.S.R.

[21] Appl. No.: 19,745

[22] Filed: Mar. 12, 1979

[51] Int. Cl.³ .................. C01D 1/30; C01D 3/24; C01D 7/24; C01D 7/40
[52] U.S. Cl. .................. 428/542; 23/302 R; 23/304; 23/305 A; 23/313 R; 23/313 P; 156/625; 428/543
[58] Field of Search ............. 23/302 R, 304, 305 A, 23/315 R, 315 P; 428/542, 543; 156/625

[56] References Cited

U.S. PATENT DOCUMENTS

| | | | |
|---|---|---|---|
| 3,527,574 | 9/1970 | La Belle | 23/305 A |
| 3,528,765 | 9/1970 | Fay et al. | 23/302 |
| 3,607,752 | 9/1971 | Graenicher | 23/302 |
| 3,634,033 | 1/1972 | Butler et al. | 23/304 |
| 3,715,194 | 2/1973 | Plooster | 23/305 A |
| 3,766,080 | 10/1973 | Swinehart et al. | 23/302 |
| 3,824,302 | 7/1974 | Alexandrov et al. | 23/305 A |
| 3,883,313 | 5/1975 | Cullen et al. | 23/304 |
| 3,899,304 | 8/1975 | Linares | 23/302 R |
| 3,917,462 | 11/1975 | Yancey | 23/302 R |
| 3,981,818 | 9/1976 | Swinehart et al. | 23/302 R |
| 4,050,905 | 9/1977 | Swinehart | 23/304 |

OTHER PUBLICATIONS

Panizza, *Physics Letters,* vol. 10 (1), May 15, 1964, pp. 37–38.

*Primary Examiner*—James C. Cannon
*Attorney, Agent, or Firm*—Lackenbach, Lilling & Siegel

[57] ABSTRACT

A detector for thermoluminescence dosimetry (TELDE TM) based on an ionic compound is shaped as a pellet. The pellet is composed of a plurality of single-crystal particles bonded together by molecular forces. A method for manufacturing such a detector is carried out by melting a powdered ionic compound in vacuum and then slowly cooling it whereby a pellet is formed.

9 Claims, No Drawings

DETECTOR FOR THERMOLUMINESCENCE DOSIMETRY

FIELD OF APPLICATION

The present invention relates to ionizing radiation dosimetry and, more particularly, to detectors for thermoluminescence dosimetry employed in nuclear medicine, personal radiation monitoring and antipollution systems and devices. The invention further relates to methods for manufacturing such detectors. The term "TELDE" is a trademark for "thermoluminescence dosimetry."

PRIOR ART

There is known a detector for a thermoluminescence dosimeter, comprising a loose powder of an ionic compound.

Detectors of this type are marked by a strong triboluminescence, which affects their sensitivity. Besides, the handling of loose powder is inconvenient for the user.

More convenient detectors are of the type that comprises powder glued or compressed into a single body encased in a housing with transparent walls.

In such detectors, triboluminescence is somewhat reduced, yet they are disadvantageous due to the complexity of their manufacture; besides, the housing of the detector may luminesce and thus, in itself, be the cause of measuring errors.

Finally, there is a known thermoluminescence detector, comprising a pellet of a compressed ionic compound (cf. G.D.R. Pat. No 42,614 of 1965, cl. 21 g, 18/02).

The latter type of detector has no housing which could be the cause of errors. However, this detector produces a trustworthy result, for one application only. The reason is that the heat treatment involved in the readout process brings about microscopic defects in the detector structure which is composed of mechanically bonded powder particles. Such microscopic defects reduce the detector's sensitivity.

SUMMARY OF THE INVENTION

It is an object of the present invention to provide a detector for thermoluminescence dosimetry, which is suitable for multiple use, and is reliable, highly sensitive, and convenient in operation.

It is a further object of the invention to provide a simple and cheap method for manufacturing such a detector.

These objects are attained by providing a detector for thermoluminescence dosimetry, comprising an ionic compound, shaped as a pellet, wherein, according to the invention, the pellet is composed of a plurality of single-crystal particles bonded together by molecular forces.

In order to ensure a highly reproducible results, the surface roughness of the pellet must not be greater than 0.1 mu.

The invention is further concerned with providing a method for manufacturing a detector for thermoluminescence dosimetry, which consists in producing a pellet from a powdered ionic compound. This is accomplished by maintaining the starting material in vacuum or in an inert atmosphere at a temperature higher than the melting point of the starting material, under which conditions said material is maintained until complete melting, whereupon it is cooled to a temperature 150° C. to 200° C. below its melting point, the cooling proceeding at a rate of 0.5 to 2 degrees per second.

A cooled pellet may be subjected to chemical polishing.

In case the detector is based on lithium fluoride, the operation of chemical polishing should be carried out in strong orthophosphoric acid, followed by washing the detector in distilled water.

The detector in accordance with the invention is suitable for multiple use, and is highly sensitive, convenient in operation and easy to manufacture.

DETAILED DESCRIPTION OF THE INVENTION

The invention will be better understood from a consideration of the following detailed description of preferred embodiments thereof.

According to the invention, the detector for thermoluminescence dosimetry is based on an ionic compound and shaped as a pellet composed of a plurality of single-crystal particles bonded together by intramolecular forces.

The pellet may be of any shape and size. The ionic compound is selected from the group consisting of $KCl$, $LiNbO_3$, $CaF_2$, $LiF$, $Al_2O_3$ and some other compounds.

The detector according to the invention can be manufactured as follows. The starting material is a powdered ionic compound which is placed in a pellet-shaped crucible and maintained in vacuum or an inert atmosphere of argon or helium maintained at a temperature 30° C. to 100° C. higher than the melting point of the starting material. The latter is kept in the crucible until complete melting which may take 15 to 45 minutes. The melt is then slowly cooled at a rate of 0.5 to 2 degrees per second to a temperature 150° C. to 200° C. below the melting point of said starting material. As this takes place, the starting material recrystallizes into a crucible-shaped pellet structurally composed of a plurality of single-crystal particles bonded together by molecular forces.

According to an alternative embodiment of the invention, the surface roughness of the pellet is not greater than 0.1 mu.

The above degree of surface finish can be attained by mechanical working, but it is best to use chemical polishing, which operation should be carried out either immediately after the pellet is cooled, or immediately before putting the detector to use.

Unlike mechanical working, chemical polishing does not damage the crystal structure of the pellet's outer layer. It may be stated that a detector with such a surface produces no background signal which could be taken into account, because such a detector is resistant to chemisorption of atmospheric vapor, which normally results in chemiluminescence; such a detector is also resistant to mechanical effects which may be the cause of triboluminescence. As a result, the detector according to the invention features better reproducibility, as compared to conventional detectors.

When a detector is manufactured from lithium fluoride, the operation of chemical polishing should be carried out in concentrated orthophosphoric acid, after which the detector is washed in distilled water.

The following examples will serve as illustration of some preferred embodiments of the invention.

EXAMPLE 1

The starting material is powdered activated lithium fluoride with a grain size of 0.18 to 0.20 mm and a melting point of 862° C. The starting material is placed in a graphite crucible with 25 recesses, each recess having a diameter of 4 mm and a height of 2 mm. The starting material is then heated at 950° C. in vacuum for 15 minutes until it fully melts, whereupon the melt is cooled at a rate of 0.6 degree per second down to 700° C. and then at a rate of 10 degrees per minute to room temperature. The pellets thus produced can be used as detectors for thermoluminescence dosimetry. According to tests, the pellets perform very well and are convenient in use. No triboluminescence is observed.

EXAMPLE 2

Pellets produced according to the process described in Example 1 are subjected to chemical polishing in strong orthophosphoric acid at 130° C. for 1.5 to 3 minutes. The pellets are then washed in hot distilled water at 80° to 90° C., then in cool distilled water, and finally dried in the air.

Detectors thus produced were exposed to 0.01 radian of gamma radiation and checked with the use of special equipment. According to 40 checks of a single detector, the mean square measurement error is not in excess of ±4%.

The reproducibility of unpolished detectors produced according to Example 1 is ±10%, due to a poorer signal-to-noise ratio.

EXAMPLE 3

The starting material is powdered lithium niobate with a grain size of 0.1 to 0.2 mm and a melting point of 1,260° C. The powder is placed in a platinum crucible and completely melted at 1,290° C. The melt is then cooled to room temperature at a rate of not more than 50 degrees per minute. The pellets thus produced undergo chemical polishing in a solvent containing 1 part by volume of hydrofluoric acid and 3 parts by volume of strong nitric acid. The polishing is carried out at a temperature of 50° to 80° C. for 5 to 8 minutes, whereupon the pellets are washed in distilled water and dried in the air.

Upon exposure to $10^3$ radians of gamma radiation, the detectors show a reproducibility of ±5%.

EXAMPLE 4

The starting material is powdered potassium chloride with a grain size of 0.10 to 0.15 mm and a melting point of 770° C. The powder is placed in a platinum crucible and heated at 810° C. in vacuum or in an inert atmosphere until complete melting. The melt is then cooled at a rate of 0.6 degree per second to 550° C. and further on at a rate of not more than 10 degrees per second to room temperature. The pellets thus produced undergo chemical polishing in a solution containing 0.5 percent by weight of $FeCl_3$ dissolved in 80–85% ethyl alcohol. The chemical polishing is carried out during 3 to 5 minutes. The pellets thus produced are washed in 96% ethyl alcohol and dried in the air.

When exposed to multiple irradiation, the detectors show a reproducibility of ±10%.

What is claimed is:

1. A detector for thermoluminescence dosimetry comprising an ionic compound in the shape of a pellet consisting of a plurality of single-crystal particles bonded together by intramolecular forces arising from the heating of said ionic compound to a temperature above its melting point, followed by controlled cooling.

2. The detector of claim 1, whereby the surface roughness of said pellet is not greater than 0.1 mu.

3. A method for manufacturing a detector consisting of a plurality of single-crystal particles bonded together by intramolecular forces for thermoluminescence dosimetry comprising the operations: maintaining the starting powdered ionic compound in vacuum or an inert atmosphere at a temperature higher than the melting point of said starting compound until complete melting thereof, producing a pellet from said melt, cooling said melt to a temperature 150° C. to 200° C. below its melting point, the cooling being effected at a rate of 0.5 to 2 degrees per second.

4. The method of claim 3, wherein said cooled pellet is subjected to chemical polishing.

5. The method of claim 4 wherein the ionic compound is lithium fluoride, the operation of chemical polishing being carried out in concentrated orthophosphoric acid and followed by washing the pellet in distilled water.

6. The detector of claim 1, wherein said ionic compound is selected from the group consisting of KCl, $LiNbO_3$, $CaF_2$, LiF, and $Al_2O_3$.

7. The method of claim 3, wherein said ionic compound is selected from the group consisting of KCl, $LiNbO_3$, $CaF_2$, LiF, and $Al_2O_3$.

8. The method of claim 3, wherein the inert atmosphere comprises argon or helium maintained at a temperature of 30° to 100° C. higher than the melting point of the starting material.

9. The product formed by the method of any of claims 3, 4, 5 or 7.

* * * * *